United States Patent

[11] 3,611,314

[72] Inventors John P. Pritchard, Jr.; Herschell F. Murry, both of Dallas, Tex.

[21] Appl. No. 856,267
[22] Filed Sept. 9, 1969
[45] Patented Oct. 5, 1971
[73] Assignee Texas Instruments Incorporated Dallas, Tex.

[54] DYNAMIC ASSOCIATIVE DATA PROCESSING SYSTEM
36 Claims, 6 Drawing Figs.

[52] U.S. Cl. .......... 340/172.5
[51] Int. Cl. .......... G11b 13/00
[50] Field of Search .......... 340/172.5

[56] References Cited

UNITED STATES PATENTS

| | | | |
|---|---|---|---|
| 3,387,277 | 6/1968 | Singer et al. | 340/172.5 |
| 3,402,394 | 9/1968 | Koerner et al. | 340/172.5 |
| 3,419,851 | 12/1968 | Burns | 340/172.5 |
| 3,544,975 | 12/1970 | Hunter | 340/172.5 |
| 3,350,698 | 10/1967 | Pritchard | 340/172.5 |
| 3,435,423 | 3/1969 | Fuller et al | 340/172.5 |
| 3,456,243 | 7/1969 | Cass | 340/172.5 |

*Primary Examiner*—Raulfe B. Zache
*Attorneys*—Samuel M. Mims, Jr., James O. Dixon, Andrew M. Hassell, Harold Levine, John E. Vandigriff, Melvin Sharp and William E. Hiller

ABSTRACT: An associatively organized data processing system is disclosed. The bits of each data word are recorded radially on a magnetic disk by means of a separate read-write head for each bit track. Logic circuitry is provided for each read-write head to perform associative processing. Thus, all words in memory can be associatively processed after one revolution of the disk. The match and occupancy status of each work is determined by corresponding bits on an occupancy-status track and a match-status track. The status tracks are updated as each word is logically processed by means of spaced read and write heads and shift registers to delay the bits of status data before they are updated and recorded back on the disk in accordance with the associative processing of the words.

INVENTORS
JOHN P. PRITCHARD, JR.
HERSCHELL F. MURRY

E. Mickey Hubbard
ATTORNEY

INVENTORS:
JOHN P. PRITCHARD, JR.
HERSCHELL F. MURRY

E. Mickey Hubbard
ATTORNEY

INVENTORS:
JOHN P. PRITCHARD, JR.
HERSCHELL F. MURRY

E. Mickey Hubbard
ATTORNEY

INVENTORS:
JOHN P. PRITCHARD, JR.
HERSCHELL F. MURRY

E. Mickey Hubbard
ATTORNEY

DYNAMIC ASSOCIATIVE DATA PROCESSING SYSTEM

This invention relates generally to data processing, and more particularly, relates to a dynamic associative data processor in which the words are continually cycled past a processing window.

In previous associative data processors, the data words are written or stored at any vacant word position in the memory and no record of the address or geometric position of the word is kept for the purpose of subsequent retrieval. The data words are subsequently identified and/or processed solely by comparing a selected portion of the words with a selected norm or argument. In general, all words in the memory have the same number of bit positions, and a corresponding unmasked bit position of interest in all words, or a selected set of words, are simultaneously compared with the argument. Thus, the memory can be searched parallel by word in all searches, and parallel by bit in some searches, so that all words having a predetermined value at the bit positions relative to an argument can be simultaneously identified without first retrieving the word from memory.

As a result of the capability to search corresponding bit positions parallel by word, associative memory systems offer a practical approach to classification of data as to relative magnitude with respect to a norm, i.e., "equal to," "greater than," "less than" and the complements and concatenations thereof. In addition, the data can also be classified on an extremum basis relative to an argument or relative to other words in memory.

U.S. Pat. No. 3,350,698 discloses a cryogenic associative processing system. The system disclosed in the patent is fabricated of thin film microcircuits on substrates which are operated at cryogenic temperatures to achieve superconductivity. The system is characterized by the fact that each bit storage position includes logic means for making, at a minimum, a determination that the bit matches or does not match an argument. In such a system, the data words are physically stored at stationary positions, even though such geographical positions within the memory are unknown. The speed of such a system is determined primarily by the propagation delays so that the parallel searches can be made very rapidly, even when using extremely large memories. Even though such a system has some economic disadvantages, such a system represents one of the more practical approaches to associative data processing heretofore considered.

This invention is concerned with an associative data processing method and apparatus which is economically feasible using current state of the art magnetic storage and semiconductor technology. In accordance with this invention, the associative data words are stored in a continuously cycling mode for sequential presentation at a processing window at a high rate. A single set of comparison logic is used to perform the various associative processing functions on the words as the words are presented at the processing window.

In the specific embodiment of the invention hereafter described in detail, the words are stored on a rotating magnetic surface by means of a separate read-write head for each bit track. The bit positions under the several heads at any point in time then constitute the bits of the respective associative words. Additional data tracks together with shift registers perform the functions of an occupancy register and a match register to achieve associative processing.

The novel features believed characteristic of this invention are set forth in the appended claims.

The invention itself, however, as well as other objects and advantages thereof, may best be understood by reference to the following detailed description of illustrative embodiments, when read in conjunction with the accompanying drawings, wherein.

Figure 1:
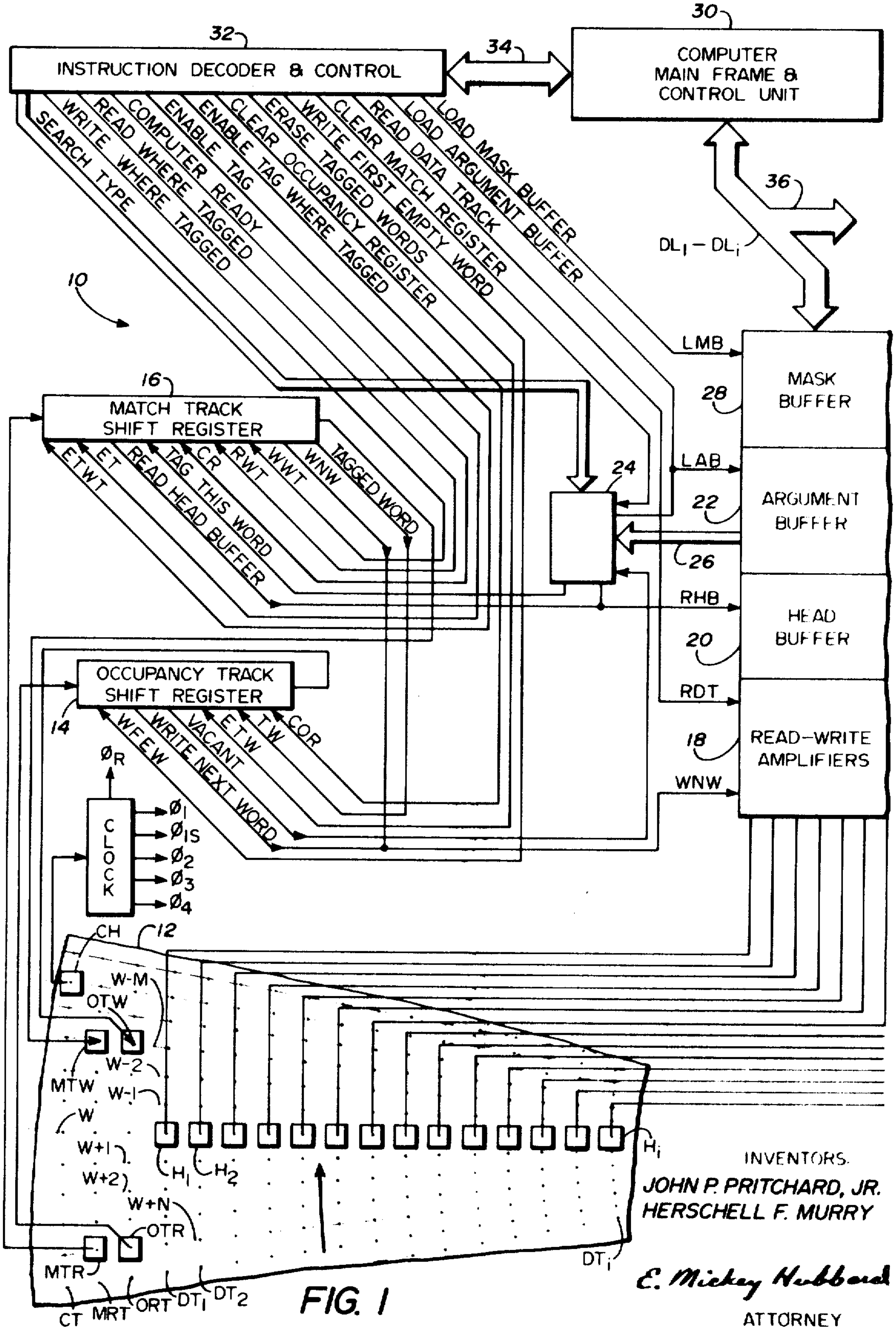
FIG. 1 is a schematic block diagram of an associative data processing system in accordance with the present invention.
Figure 6:
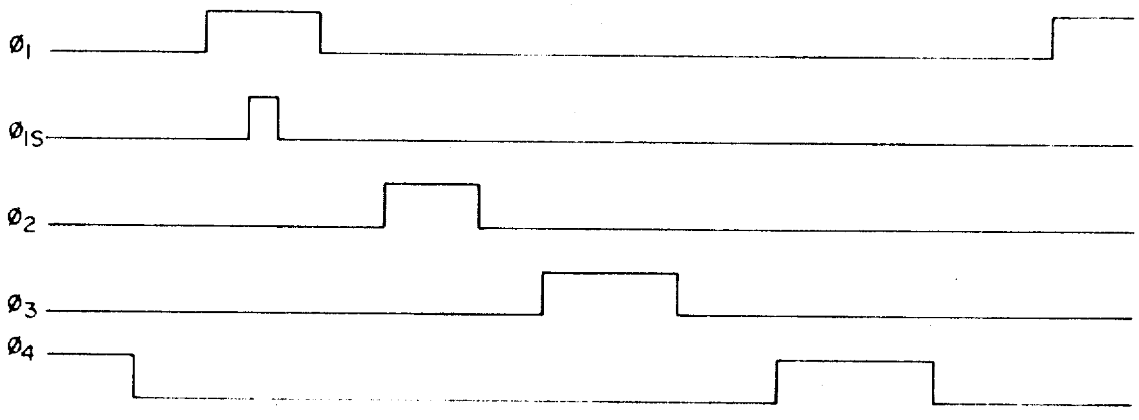
FIG. 6 is a timing diagram of the various clock pulses for the system of FIG. 1.

Referring now to the drawings, and in particular to FIG. 1, a data processing system in accordance with the present invention is indicated generally by the reference numeral 10. The system 10 includes a conventional magnetic disk 12 of the type presently used in digital computers. A set of conventional magnetic read-write heads $H_1$–$H_i$ define a set of data tracks $DT_1$–$DT_i$. Clock pulses are permanently recorded on a clock tract CT. A clock read head CH reproduces a series of timing pulses to synchronously control operation of that portion of the processing system located at the magnetic disk. The output from the clock read head CH is applied to a clock which produces successive timing pulses $\phi_1$, $\phi_{1s}$, $\phi_2$, $\phi_3$ and $\phi_4$ during the interval required for successive word radials to be positioned under the data heads. The time relationship of the clock pulses is illustrated in FIG. 6. The clock also produces a reference clock pulse $0_R$ once each revolution of the disk. The read-write heads $H_1$–$H_i$ are always operated in synchronism when writing so that a number of data bits corresponding to the number of heads $H_1$–$H_i$ are oriented generally in a radial relationship and are for simplicity referred to as word radials. The word radial currently under the read-write heads $H_1$–$H_i$ is always designated as word W, for purposes of discussion, while those words approaching the read-write heads are designated W + 1, W + 2...W + *n*, and those moving away from the heads are designated W−1, W−2...W−*m*. The bit positions of an occupancy track OT form an occupancy register, and the bit positions of a match tract MT form a match register. Read heads OTR and MTR are positioned over the occupancy and match register tracks at word radial W+*n*. Write heads OTW and MTW are positioned over the occupancy and match register tracks, respectively, at word radial W−*m*.

The bits of information read from the occupancy track read head OTR is fed to an occupancy track shift register 14, and output from the occupancy track shift register 14 are written back on the occupancy track by write head OTW. The occupancy track shift register 14 has the same number of bits as the number of word radials between word radial W+*n* and word radial W−*m*. Similarly, the bits of information read from the match register track MRT by read head MTR are fed to input of a match track shift register 16, and the output of the match track shift register 16 is written back on the match register track MRT by write head MTW. The match track shift register has the same number of bits as the number of words between word W+*n* and W−*m*.

The read-write heads $H_1$–$H_i$ are operated by a set of read-write amplifiers 18. When operating in the read mode, the amplifiers 18 transfer the bits from the respective data tracks to a head buffer 20. When operating in the write mode, the read-write amplifiers 18 transfer data stored in an argument buffer 22 to the data tracks. Logic data is also provided at each bit position to compare the argument buffer bit with the head buffer bit and produce a logic signal representing "equal" or "not equal" and "greater than" or "not greater than." These outputs are individually applied to the search logic 24 by way of channel 26.

To read, write, and match functions are all enabled by data stored in a mask buffer 28. A single set of data links $DL_1$–$DL_i$ are used to input data from a central computer and control unit 30 to the mask buffer 28 and argument buffer 22, and to output data from the head buffer 20 to the unit 30.

An instruction decoder and control unit 32 decodes instruction and control signals from the computer 30 by way of channel 34, and returns status data to the computer. The status data inputs to and outputs from the instruction decoder and control unit 32 are not illustrated in order to simplify the disclosure. In general, all logic outputs from shift register 14 and 16 and search logic 24 is fed back to the decoder for control purposes, but these lines are not illustrated. The various bookkeeping and control functions required to operate the system 10 will be evident to those possessing ordinary skill in the computer art and, accordingly, are not herein described in detail.

The portion of the system thus far described relates only to a single surface of a magnetic disk. A typical magnetic disk will accommodate approximately 300 data tracks and, accordingly, will provide a word length of approximately 300 bits. The number of bits in the data words can be increased by providing additional magnetic surfaces rotated in synchronism with the magnetic disk 12, either by a direct mechanical coupling, or by other synchronization means. It should also be appreciated that the actual position of the various read-write heads is immaterial so long as the positions remain stationary. Thus, the read-write heads $H_1$–$H_i$ can be staggered as required by the physical size of the heads without affecting the operation of the system. Also, the read and write heads associated with the occupancy register track and match register track can be offset in any necessary manner so long as the number of bits in the respective shift registers correspond to the number of bit positions between the physical location of the read and write heads for the respective tracks. If desired, additional surfaces can be operated in parallel with that shown by way of a branch 36 of data link $DL_1$, and by the same instruction decoder and control 32.

Figure 2:
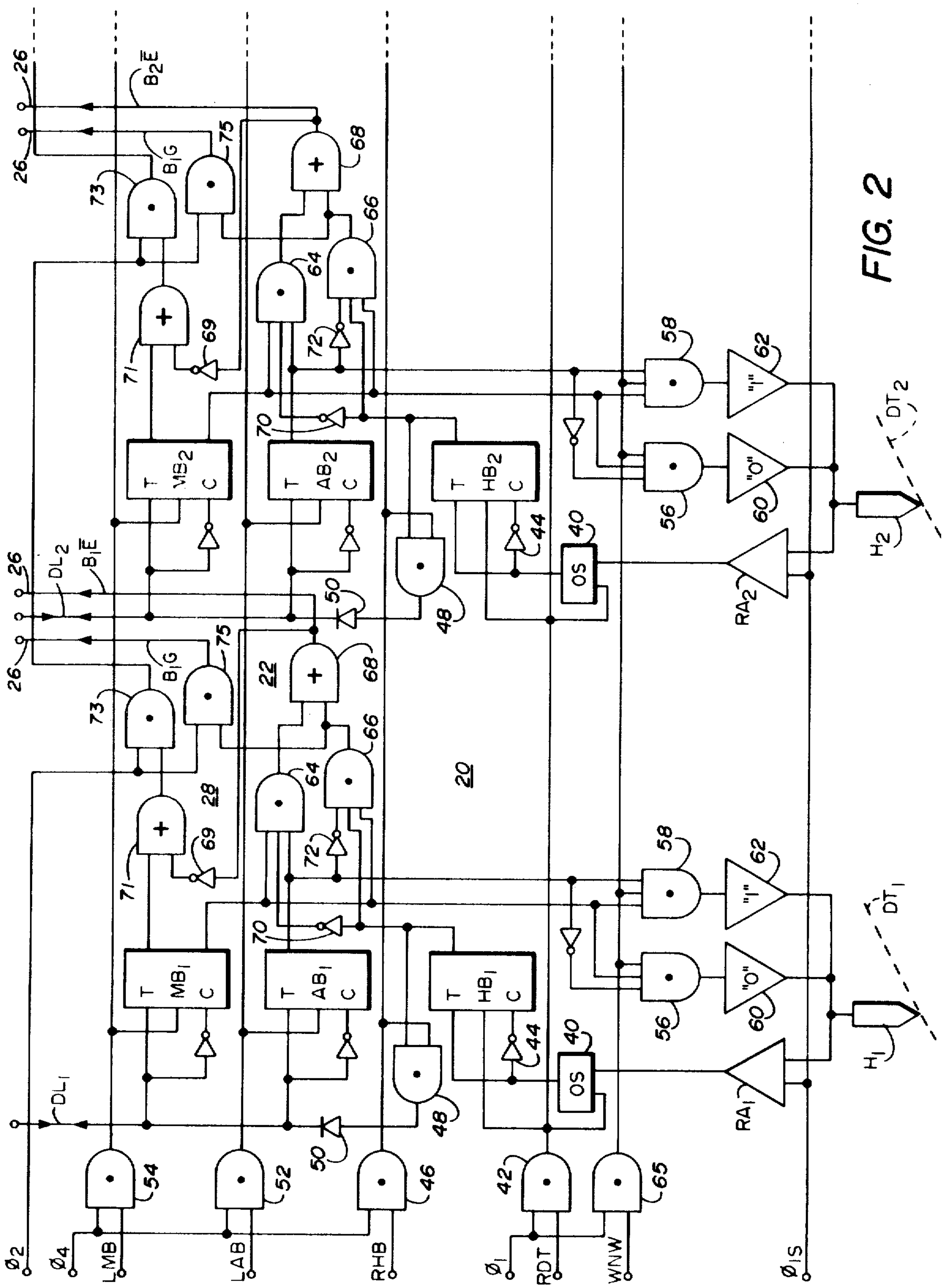
FIG. 2 is a schematic logic circuit diagram illustrating two bit positions of the mask buffer, argument buffer, head buffer, and read-write amplifiers of the system of FIG. 1.

Referring now to FIG. 2, flip-flops $MB_1$ and $MB_2$ represent the first two bits of the mask buffer 28, flip-flops $AB_1$ and $AB_2$ represent the first two bits of the argument buffer 22, and flip-flops $HB_1$ and $HB_2$ represent the first two bits of the head buffer 20. A read amplifier $RA_1$ is strobed by clock pulse $\phi_1$, to read data track $DT_1$ through head $H_1$. The output from the read amplifier $RA_1$ is applied to a pulse-shaping one-shot circuit 40. When a clock pulse $\phi_1$ is gated through AND gate 42 by a read-data-track signal on line RDT, the one-shot circuit 40 is enabled to produce a pulse output from the one-shot circuit 40 which is applied to the true input of the head buffer bit $HB_1$ which endures until the fall of clock pulse $\phi_1$. An inverter 44 also applies the complement of the output of the one-shot circuit 40 to the complement input of bit $HB_1$.

The logic level stored in flip-flop $HB_1$ of the head buffer 20 is read out to the computer 30 through diode 50 by way of data link $DL_1$ when a logic "1" level is applied to the read head buffer line RHB to gate a clock pulse $\phi_4$ through gate 46 to gate 48. This output is also a means of transferring the data in the head buffer HB to the argument buffer AB when line LAB is also a logic "1" level for performing "maximum" and "minimum" searches as is hereafter described. Diode 50 also permits data link $DL_1$ to be used to load bit $AB_1$ of the argument buffer 22 and bit $MB_1$ of the mask buffer 28 when a $\phi_4$ clock pulse is gated through gates 52 and 54, respectively, by logic "1" levels on the load argument buffer line LAB and load match buffer line LMB, respectively.

When a logic "0" is stored in flip-flop $MB_1$ of the match buffer, the complement output of the flip-flop enables AND gates 56, 58, 64 and 66 to thereby "unmask" the bit. The logic level stored in bit $AB_1$ of the argument buffer 22 may then be written on data track $DT_1$ when the write-in-next-word line WNW gates a clock pulse $\phi_1$ to gates 56 and 58. Write amplifiers 60 and 62 then write either a logic "0" or logic "1," respectively, when the output of the bit $AB_1$ is a logic "0" or a logic "1."

The logic level stored in bit $AB_1$ of the argument buffer and the logic number stored in bit $HB_1$ of the head buffer are compared by AND gates 64 and 66 and OR gate 68 to produce a signal on a "not equal" line $B_1\bar{E}$. For example, if bits $AB_1$ and $HB_1$ both contain a logic "1," the inverters 70 and 72 will disable both gates 64 and 66, thus making the output of OR gate 68 a logic "0." The same result occurs if both bits $AB_1$ and $HB_1$ store a logic "0." However, if bits $AB_1$ and $HB_1$ have a logic "1" and a logic "0" stored, in either bit, either gate 64 or gate 66 will produce a logic "1" output, so that the output of OR gate 68 is also a logic "1," which level indicates a mismatched condition. The outputs $B_1E$–$\bar{B}_i\bar{E}$ are the inputs of channel 26 to NOR gate 24.

The outputs of gates 64, 66 and 68 are also used to perform logic when the number in the head buffer is "greater than" the number in the argument. More specifically, the output of gate 66 is the "greater than" output for the bit position. It is assumed that bit $B_1$ of the buffers is the highest order bit. A search strobe $\phi_2$ is then passed from the higher order bits successively through the AND gate 73 at each bit position. If the number in the first bit $HB_1$ of the head buffer matches the number in bit $AB_1$ of the argument buffer, the output of gate 68 enables gate 73, after passing through inverter 69 and OR gate 71, so that the search strobe $\phi_2$ passes to the next order bit. If the first bit $MB_1$ of the mask buffer contains a logic "1," indicating that the bit is "masked" and is not to be considered in the determination, the search strobe is also gated on to the next bit position by the output from flip-flop $MB_1$ by way of gate 71. If, and only if, the number in the head buffer flip-flop $HB_1$ is a logic "1" and the number in the argument buffer flip-flop $AB_1$ is a logic "0" will the output of gate 66 be a logic "1" level. This condition immediately enables AND gate 75 so that the search strobe $\phi_2$ is gated out on the "greater than" line $B_1G$. The logic "1" output from gate 68 disables gate 73, as a result of inverter 69, so that no other bits will be considered. It is important to note that a logic "1" output from gate 64, representing a "less than" decision, also produces a logic "1" output from gate 68. This stops the search strobe $\phi_2$ at the highest order bit at which the numbers are not equal thus insuring that a "greater than" determination in a lower order bit will not produce an erroneous search result.

The same logic circuitry heretofore described in connection with data track $DT_1$ is provided for each of the other data tracks, although only data track $DT_2$ is illustrated in FIG. 2. For convenience of illustration, the corresponding logic components associated with data track $DT_2$ are designated by the same reference numerals.

Figure 5:
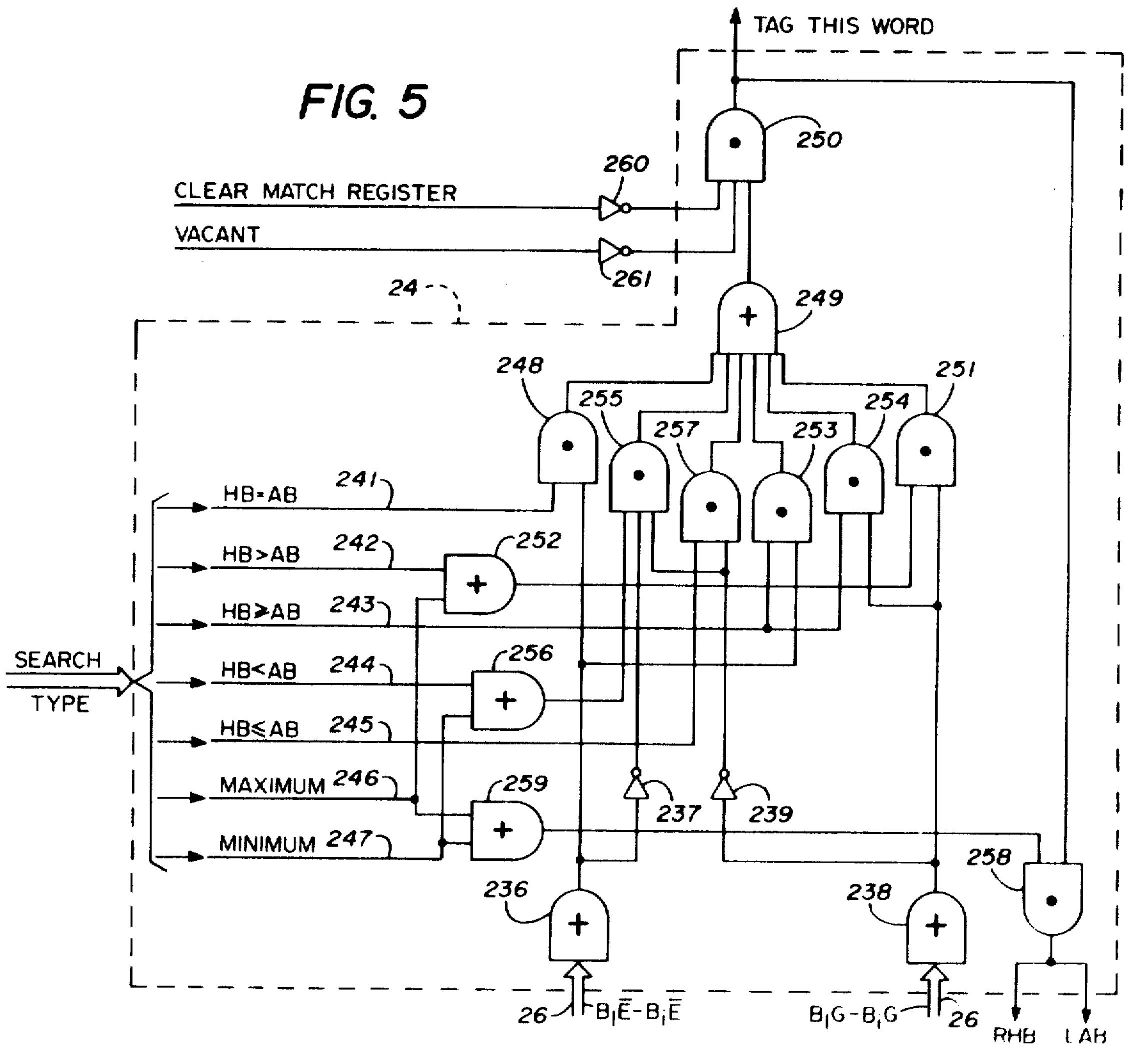
FIG. 5 is a schematic logic circuit diagram of the search logic shown in FIG. 1.

The outputs $B_1\bar{E}$ through $B_i\bar{E}$ and $B_1G$ through $B_iG$ are combined in channel 26 and applied to the search logic 24 which is shown in detail in FIG. 5. The logic outputs $B_1\bar{E}$–$B_i\bar{E}$ are applied to a NOR gate 23 and the logic outputs $B_1G$–$B_iG$ are applied to OR gate 238. The complements of the outputs of gates 236 and 238 are derived by inverters 237 and 239, respectively, and these four logic levels can be used to perform the types of searches HB=AB, HB≥AB, HB AB, HB≤AB, HB AB, Maximum and Minimum, where HB is the number in the unmasked bits of the head buffer and AB is the unmasked bits in the argument buffer. These searches are initiated by the decoder 32 through search control lines 241–247.

Thus to determine which words in memory are equal to the argument, line 241 is raised to a logic "1" level to enable AND gate 248. Then when HB=AB, the logic "1" output from gate 248 will be passed through OR gate 249 and AND gate 250 to the "tag this word" output.

When control line 242 is at the logic "1" level, AND gate 251 is enabled by the output of OR gate 252 so that a logic "1" level on gate 238, which indicates HB>AB, will produce a logic "1" from gate 250.

When control line 243 is at a logic "1" level, AND gates 253 and 254 are enabled so that either a logic "1" level from gate 236, indicating HB=AB, or a logic "1" level from gate 238, indicating HB>AB, will produce a logic "1" level from gate 250.

When control line 244 is at a logic "1" level, AND gate 255 is enabled by the output of OR gate 256 so that when the outputs of inverters 237 and 239 are both at a logic "1" level, indicating that HB≠AB and HB≤AB, a logic "1" level will be output from gate 250.

When control line 245 is at a logic "1" level, AND gate 257 is enabled so that when the output of inverter 239 is a logic "1" level, indicating that HB≤AB, a logic "1" level will be output from gate 250.

When control line 246 is at a logic "1" level, indicating a search for the maximum word in memory, AND gates 251 and 258 are enabled through OR gates 252 and 259. Then when the output of gate 238 is a logic "1" level, indicating that HB>AB, gate 258 produces a logic "1" level on the read head buffer control line RHB and the load argument buffer control line LAB so that the word in the head buffer is transferred to the argument buffer through diodes 50. Thus after one pass through the memory, the last word transferred to the argument buffer will be the maximum word in memory, and this is monitored by the computer through the data lines $DL_1$–$DL_i$ so that no further transfer is required. If desired, additional logic can be provided to read the data from the argument buffer.

When control line 247 is a logic "1" level, indicating a search for the minimum word in memory, AND gates 255 and 258 are enabled through OR gates 256 and 259. The procedure is the same as that described in the preceding paragraph, except that each time HB<AB, the word will be transferred from the head buffer to the argument buffer.

Gate 250 is disabled by the outputs from inverter 260 when it is desired to clear the match register or by the output from inverter 261 when the occupancy register indicates that the word is vacant, as will hereafter be described in greater detail.

Figure 3:
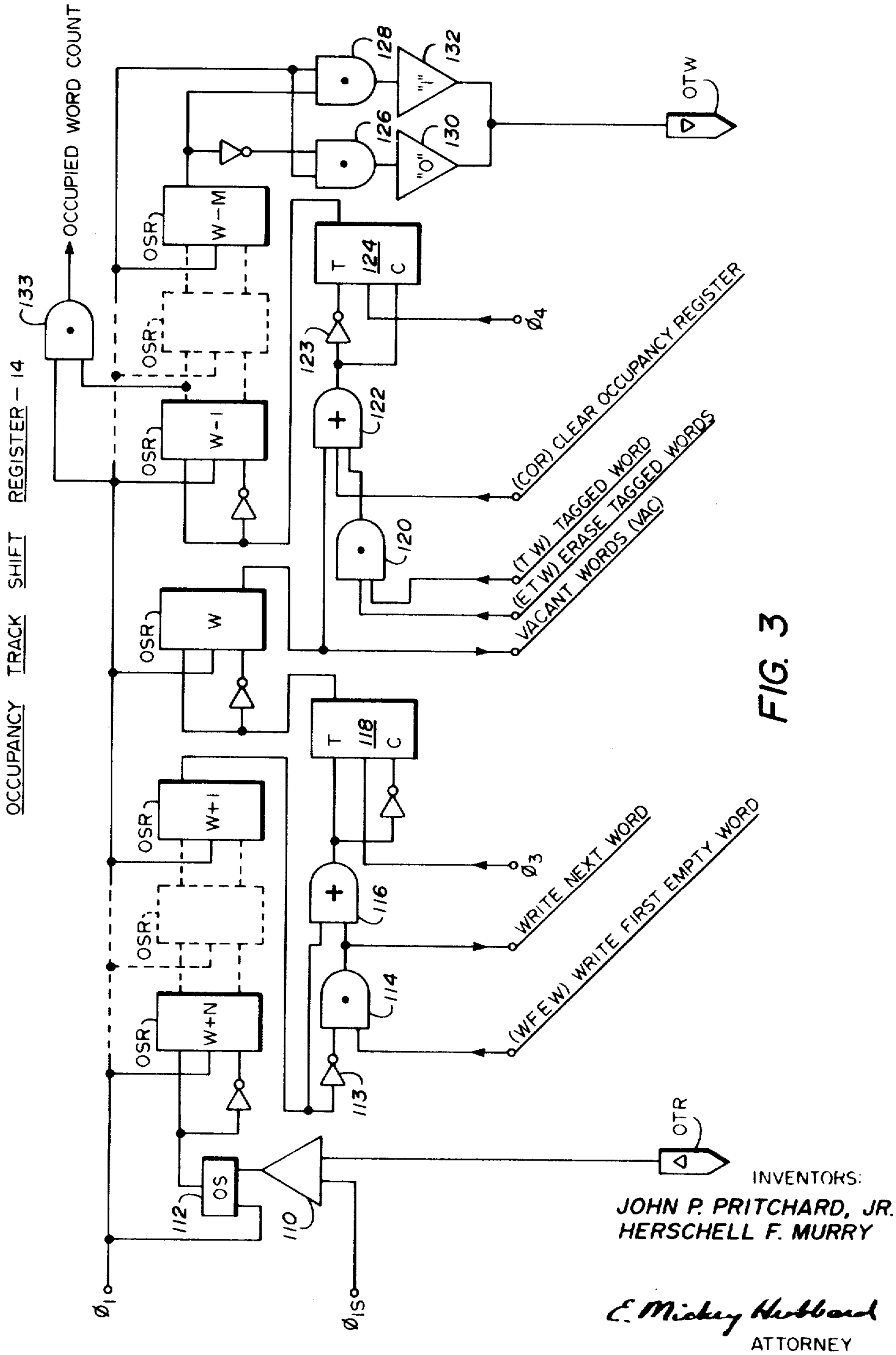
FIG. 3 is a schematic logic circuit diagram of the occupancy track shift register of the system of FIG. 1.

The occupancy track shift register 14 is shown in detail in FIG. 3. The shift register 14 provides a means for anticipating the approach of each word that is to be processed by the read-write heads $H_1$–$H_i$. The occupancy track shift register 14 has a number of flip-flops OSR equal to the number of word radials between the occupancy track read head OTR and the occupancy track write head OTW. The logic state of flip-flop W+*n* therefore represents the occupancy status of the track that was disposed under the read head OTR during the preceding clock pulse $\phi_1$. Similarly, the state of flip-flop W+1 represents the occupancy status of word radial W+1, the state of flip-flop W represents the occupancy status of word radial W that was just read from the data heads $H_1$–$H_i$ into the head buffer 20, the state of flip-flop W−1 represents the occupancy status of the word W−1 which just passed the heads $H_1$–$H_i$ and, finally, flip-flop W−*m* represents the occupancy status of the word radial under the occupancy track write head OTW.

An inverter 113, an AND gate 114, an OR gate 116 and a flip-flop 118 provide a means for performing logic functions in anticipation of the positioning of the corresponding word at the read-write data heads $H_1$–$H_i$. Thus, a logic "1" level on the "write-in-first-empty-word" output WFEW from the instruction decoder 32 will result in a logic "1" at the output of gate 114 whenever the true output of occupancy shift register flip-flop W+1 is a logic "0" level, indicating that the next word radial to be positioned under the heads $H_1$–$H_i$ is vacant. The logic "1" level on the write in next word line WNW enables gate 65 in FIG. 2 so that the word stored in the argument buffer 22 will be written on the data track on the occurrence of the next clock pulse $\phi_1$. The logic "1" level is also applied to OR gate 116 which then sets delay flip-flop 118 to a logic "1" level on the fall of the next $\phi_3$ clock pulse so that a logic "1" will be automatically introduced to flip-flop W as the data word is recorded by the data heads $H_1$–$H_i$.

The complement output of occupancy shift register flip-flop W is applied by OR gate 122 and then by an inverter 123 to the true input of a second delay flip-flop 124 which is operated by clock pulse $\phi_4$. The input TW represents a tagged word from the match track shift register 16, presently to be described, and input ETW is the "erase tagged word" instruction from the instruction decoder 32. When both of these lines are at a logic "1," the output of AND gate 120 is a logic "1" which is passed through OR gate 122 and recorded as a logic "0" in delay flip-flop 124, thus entering a logic "0" in the occupancy shift register on the next $\phi_1$ clock pulse indicating that the word is vacant. Input COR to OR gate 122 is the clear occupancy register instruction from instruction decoder 32 and results in the entry of a logic "0" in delay flip-flop 124.

The output from flip-flop 124 is then applied as an input to OSR flip-flop W−1 on the next $\phi_1$ clock pulse and the logic state is shifted through the occupancy shift register until it is finally recorded on the occupancy track through gates 126 or 128, write amplifiers 130 or 132, and the occupancy track write-head OTW.

The output of OSR flip-flop W−1 is applied to a gate 133 along with clock pulse $\phi_1$ to provide an occupied word count output which is sent to the instruction decoder and control circuit 32 for control purposes.

Figure 4:
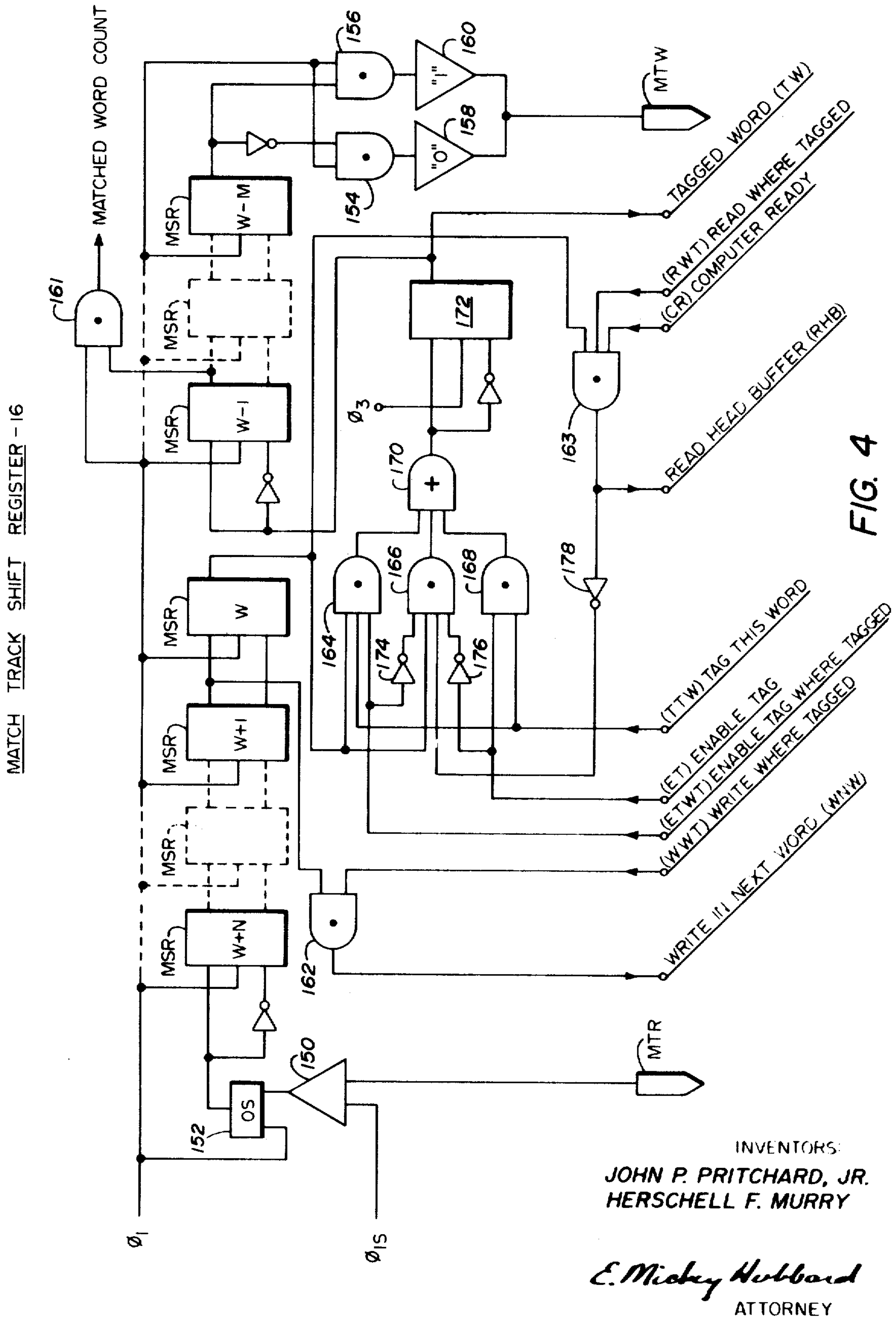
FIG. 4 is a schematic logic circuit diagram of the match track shift register of FIG. 1.

The match track shift register 16 is shown in detail in FIG. 4. The shift register 16 is very similar to the occupancy track shift register 14 except for the logic functions performed. The match track shift register is comprised of a plurality of flip-flops MSR which are designated in the same manner as the flip-flops OSR in FIG. 3. Thus the state of MSR flip-flop W represents the match status of the word radial under the data heads $H_1$–$H_i$ at the occurrence of each successive clock pulse $\phi_1$. The state of MSR flip-flop W+1 represents the word radial track which will be positioned under the data track head $H_1$–$H_i$ during the next clock pulse $\phi_1$, and the state of MSR flip-flop W−1 represents the word radial which was under the data track heads $H_1$–$H_i$ during the preceding clock pulse $\phi_1$. The data bits are read from the match register track by read head MTR when amplifier 150 is strobed by clock pulse $\phi_1$, during the period of time that one shot 152 is enabled by clock pulse $\phi_1$ and the bit of data is stored in MSR flip-flop W+*n*. The data bit is then propagated through the bits of the flip-flop until finally it is recorded from the output of MSR flip-flop W−*m* through gates 154 and 156, amplifiers 158 and 160, and write head MTW back on the match register track.

When a "write where tagged" instruction is sent from instruction decoder 32 so that line WWT is at a logic "1" level, and the output of MSR flip-flop W+1 is a logic "1" level, indicating that the next word has previously been tagged, the output of AND gate 162 produces a logic "1" level on output line WNW. This gates the next $\phi_1$ clock pulse through gate 65 in FIG. 2 so that the word in the argument buffer 22 is written at the appropriate word radial during the next clock pulse $\phi_1$.

The true output of MSR flip-flop W is applied to gates 164 and 166. Logic input "tag this word" which is the output of the search logic 24 (see FIG. 1), is a logic "1" level when the word read into the head buffer from the word radial represented by the state of flip-flop W satisfies the search conditions defined by the decoder 32 on lines 141–147. The inverters 174, 176 and 178 normally cause the other inputs to gate 166 to be a logic "1" level so that the output from MSR flip-flop W is gated directly through gates 166 and 170 and set into delay flip-flop 172 on the occurrence of clockpulse $\phi_3$. When a "tag where matched" signal is received from instruction decoder 32 so that line TWM is at a logic "1" level, gate 166 is disabled by inverter 176, and a logic "1" is stored in delay flip-flop 172, except when logic input "tag this word" is a logic "1," indicating that the word at word radial W satisfies the search conditions at the unmasked bits. Then the output of gate 168 is a logic "1" level which is set into flip-flop 172. If a "tag where tagged and matched" instruction is sent from instruction decode 32 by raising line TWTM to a logic "1" level, gate 166 is disabled by inverter 174, and the output of gate 164 goes to a logic "1" level only when the output of the MSR flip-flop W is a logic "1" level and logic input "tag this word" is also a logic "1" level. This logic "1" level is then passed through OR gate 170 and set into delay flip-flop 172. The output from delay flip-flop 172 is fed to the input of MSR flip-flop W−1, and is also the tagged word TW to occupancy track shift register 14, which input is used to erase tagged words from the occupancy register as previously described.

The output from MSR flip-flop W is also applied as an input to gate 163 together with "read where tagged" and "computer ready" logic signals from the instruction decoder 32. Thus, when the word W has previously been tagged, the output of gate 163 is a logic "1" level and produces a "read data tracks" signal on line RDT of FIG. 2. The logic "1" output from gate 163 is passed through inverter 178 to disable gate 166 so that a zero is introduced to the match track shift register on clock pulse $\phi_3$ to indicate that the tagged word has been read.

The output of MSR flip-flop W−1 is applied to a gate 161 together with clock pulse $\phi_1$ to provide a match word count which is sent to the instruction decoder 32.

OPERATION

In the absence of instructions from the computer, certain routine logic and control functions are performed. This condition is herein referred to as the normal mode of operation. In the normal mode, the contents of the match register track and the occupancy register track are continuously read into the occupancy track shift register 14 and the match track shift register 16. The content of the occupancy register track is maintained by the occupancy track shift register 14 through OR gate 116, the first delay flip-flop 118, OSR flip-flop W, OR gate 122, and the second delay flip-flop 124. Similarly, the contents of the match register track is maintained through AND gate 166, OR gate 170, and delay flip-flop 172. The match word count output from gate 161, and the occupied word count from gate 133 together with the reference clock $\phi_R$ are continually output to the instruction decoder and control so that these are continually available for monitoring purposes.

Clear Match Register

When the computer 30 sends a "clear match register" instruction to the decoder 32, decoder 32 outputs a logic "1" level on "clear match register" output which is applied to gate 150 through inverter 260. This causes the output of gate 150 to go to a logic "0" level, which disables gates 164 and 168 of FIG. 4. In addition, the "tag where matched" line TWM is raised to a logic "1" level, thus disabling gate 166. Since the outputs of gates 164, 166 and 168 are all logic "0," a logic "0" will be introduced to the match track shift register through delay flip-flop 172. Then after one complete revolution of the disk 12, the match register track will be a logic "0" at each bit representing a word, and the match register is then reset to a not match condition.

Clear Occupancy Register and Match Register

When the instruction decoder 32 receives an instruction to "clear the occupancy register," the match register is also automatically cleared. To accomplish this, the "clear match register" line to gate 24 and the "enable tag" line ET to match track shift register 16 are raised to a logic "1" level by decoder 32 to clear the match register as described. The "clear occupancy register" line COR to the occupancy track shift register 14 is also raised to a logic "1" level to produce a logic "1" output from OR gate 122 which is then inverted to set the delay flip-flop 124 to logic "0" so long as the logic conditions persist. After one complete revolution of the disk 12, the occupancy register track will also have been reset to contain all logic zeros representing a vacant status.

Load Mask Buffer

When the instruction decoder 32 receives an instruction to load the mask buffer from the computer 30, the decoder raises the "load mask buffer" output LMB to a logic "1" level. At the same time, the computer inputs a logic "1" on the data links $DL_1$–$DL_f$ for the bit positions which are to be masked and made inactive during the instructions to follow. Then, on the next $\phi_4$ clock pulse, the mask buffer bits will be set to a logic "1" in the corresponding bit positions. The load mask buffer input LMB is then dropped back to a logic "0" level and the logic levels removed from the data links $DL_1$–$DL_f$.

Load Argument Buffer

The argument buffer is loaded using the same procedure as that used to load the mask buffer described in the preceding paragraph, except that the instruction at decoder 32 brings the load argument buffer line LAB up to a logic "1" level so that the next $\phi_4$ clock pulse will be applied to the flip-flops AB of the argument buffer through gate 52.

Write First Empty Word

When a "write in the first empty word" instruction is sent to the instruction decoder 32, as will be the case whenever data is to be entered, the logic "1" level on the read data track line RDT for normal mode operation is shifted to a logic "0" level, and the "load argument buffer" line is raised to a logic "1" level to enable gate 52 and load the data from the data links $DL_1$–DL into the argument buffer on the occurrence of the next clock pulse $\phi_4$. The decoder 32 also activates the "write first empty word" line WFEW to the occupancy track shift register 16. As soon as the output of occupancy shift register flip-flop W+1 produces a logic "0," indicating a vacant word, the inverter 113 causes gate 114 to raise the "write in next word" output WNW to a logic "1" level. Then, on the next $\phi_1$ clock pulse, the word stored in the argument buffer 22 by the previous $\phi_4$ clock pulse is recorded as a result of the enabling of gates 56 and 58 at the various bit positions of the word radial. At the same time, the logic "1" output from gate 114 sets a logic "1" into delay flip-flop 118 on the next $\phi_3$ clock pulse to indicate that the word is now occupied. The execution of the "write in first empty word" spans a minimum of two word radial time increments, and can require up to one full revolution of the disk 12. It should be noted that where a series of words are to be entered, it is possible to enter these words in consecutive word radial positions if the word radial positions are empty.

Search and Tag

When it is desired to search the records to determine those words which satisfy a given search criteria, the following sequence is followed. First, the mask buffer is loaded by applying a logic "1" to the data links DL of each bit position that is to be disabled from the match query. Then the load mask buffer line LMB is activated for one clock pulse $\phi_4$. Then the argument buffer is loaded by putting the appropriate logic levels on the data link lines and activating the load argument buffer line LAB for one clock pulse $\phi_4$. The read data track line RDT remains activated so that each successive word will be read into the head buffer in response to the successive $\phi_1$ clock pulses. The appropriate line 141–147 is raised to a logic "1" level to define the type of search. The "enable tag" line ET from decoder 32 is then activated. As each word is read into the head buffer, the true outputs from the respective head buffer flip-flops HB and the true outputs of the corresponding argument buffer flip-flops AB are logically combined with the complement outputs of the mask buffer by gates 64,66 and 68 at each bit position. The outputs of gates 66 and 68 are combined by gates 69, 71, 73 and 75 as described above to produce logic levels on lines $B_1\bar{E}$–$B_f\bar{E}$ and $B_1G$–$B_fG$. The search logic 24 then combines the outputs to produce a logic "1" level on the "tag this word" input to the match track shift register of FIG. 4. Since the enable tag line ET is active, the gate 168 introduces a logic "1" to delay flip-flop 172. This logic state is then set into MSR flip-flop W−*m* on the next $\phi_1$ clock pulse.

It will also be noted that the vacant output from the occupancy register 14 disables gate 250 so that a word tagged as vacant can never represent a match. Of course, the clear match register input to gate 250 is inactive.

If the "tag this word" input TTW from gate 24 is a logic "0," indicating a mismatch, gates 164 and 168 will be disabled. The ET input which is active will disable gate 166 through inverter 176 so that a logic "0" level is set into delay flip-flop 172 on clock pulse $\phi_3$, indicating that the corresponding word is "mismatched."

Search And Tag Only If Previously Tagged

It is sometimes desirable to search only those words identified as matched in a previous search. This is achieved in the same manner as described in the preceding paragraph concerning a first search, except that the instruction decoder 32 activates the "enable tagged where tagged" output line ETWT, rather than the "enable tag" line ET. As a result, only gate 164 in FIG. 4 is enabled because gates 166 and 168 are disabled by the output of inverter 174 and the logic "0" on input ET. The output of gate 164 goes to a logic "1" level only when tag this word logic input TTW and the output from MSR flip-flop W are both at a logic "1" level, indicating that the word was previously tagged as a matched word, and is also a matched word with regard to the current masked argument. If these two conditions are satisfied, a logic "1" is set into delay flip-flop 172. If the conditions are not satisfied, a logic "0" is set into delay flip-flop 172.

Read Where Tagged

When it is desired to read the words tagged in the match register track, the decoder 32 activates the "read where tagged" control line RWT. A signal is sent from the computer 30 to indicate that it is ready to receive a data word, and the instruction decoder 32 activates the "computer ready" control line. Then when the output of MSR flip-flop W goes to a logic "1" level to indicate that a matched word is positioned beneath the data heads DH, the output of gate 163 goes to a logic "1" level. The output of gate 163 then activates the read data track line RDT in FIG. 2 so that the contents of the head buffer are read out on the data links DL when the gates 48 are enabled by the next clock pulse $\phi_4$ passed through gate 46. At the same time, the logic "1" level at the output of gate 163 is inverted to disable gate 166 by inverter 178. Gates 164 and 168 are also disabled because logic inputs ET and ETWT are at a logic "0" so that a logic "0" is entered in flip-flop 172, and thus introduced to the match shift register to indicate that the matched word has been read. The logic "0" is entered in flip-flop 172 during the next $\phi_3$ clock pulse, and is transferred to MSR flip-flop W−1 on the next $\phi_1$ clock pulse. The head buffer is output over the data links as a result of the enabling of the gates 48 by the next $\phi_4$ clock pulse.

Selective Write Where Tagged

In some instances it may be desirable to selectively write in predetermined bit positions of the set of words previously tagged during a search. When a "write where tagged" instruction is sent from the decoder 32 by line WWT, the load mask buffer line LMB is first raised to a logic "1" level to load the mask buffer through data links $DL_1$–$DL_i$ and mask those bits which are not to be affected by the selective write procedure. Next, the argument buffer is loaded by activating the "load argument buffer" line LAB and inputting the appropriate data on the data links $DL_1$–$DL_i$. Then the instruction decoder 32 activates the "write where tagged" instruction line. When the output of MSR flip-flop W+1 goes to a logic "1" level in response to a clock pulse $\phi_1$ indicating that the next word to be positioned at the data head is tagged, gate 162 activates the "-write in next word" logic output WNW. As a result, the data stored in the bits of the argument buffer unmasked by the mask buffer are written on the data tracks when gates 56 and 58 are enabled by the next $\phi_1$ clock pulse. It is assumed that the same data is to be entered in all matched words, and since the match register track and occupancy register track already indicate that the word is occupied and is a match, no further action is required. After one complete revolution of the disk, all tagged words will be updated with the new information only in the unmasked bit positions.

Erase Where Tagged

In some cases it may be desirable to erase a set of words identified by a match search. This requires merely that the instruction decoder 32 activate the "erase tagged words" output ETW to the occupancy track shift register 14. Then each time that a logic "1" is entered in the delay flip-flop 172 of the matched track shift register 16 on a $\phi_2$ clock pulse, the logic "1" level of the "tagged word" line TW and the "erase tagged word" line ETW will produce a logic "1" level at the output of gate 120 which will pass through gate 122 and be entered as a logic "0" by the inverter 123 in the delay flip-flop 124 on the occurrence of the next $\phi_4$ clock pulse. This will then be entered in OSR flip-flop W−1 on the next $\phi_1$ clock pulse. As illustrated, the match register track is unaffected. However, the match register track can then be reset by a clear match register instruction as previously described.

It will be appreciated by those skilled in the art that substantially any desired associative data processing can be performed using the above-described system and method. The memory can be loaded with new words in one disk revolution, provided the control unit 30 has a corresponding data input speed. All words in memory can be searched in one disk revolution to find those words that are "equal to," "less than," "less than or equal to," "greater than," or "greater than or equal to" an argument expressed at selected bit positions. Similarly, the "maximum" or the "minimum" word in memory can be determined in one disk revolution. Those words identified by any given search criteria may then be read out, may be updated in selected bit positions, or may be subjected to still another search criteria, within one disk revolution.

Although an embodiment utilizing only state of the art digital magnetic data processing hardware has been described, it is to be understood that other types of storage media can be used to practice this invention. In general, any storage means which repetitively cycles all word positions of the memory to a data processing window may be employed. For example, each data track $DT_1$–$DT_i$ may be a closed loop shift register. In such a case, all of the shift registers would have the same number of bits so that the bits of each of the words would simultaneously appear at the data processing window. The shift registers may be formed of semiconductor components such as MOS or bipolar transistors, or acoustic delay lines. It is also within the scope of the invention to use combinations of recording media to achieve the necessary repetitive cycling of the data words past the processing window. For example, shift registers similar to the match track and occupancy track 14 and 16 could be provided for the data tracks $DT_1$–$DT_i$. In such a case, the data would automatically be read from the storage medium and then recorded back on the storage medium once each cycle. It will also be appreciated that logic circuitry for performing associative processing need be provided only a portion of the bits of the words in memory for many applications, thus reducing the cost of the system. Other bit positions of the words need have only the read-write heads to store and retrieve additional data.

Although preferred embodiments of the invention have been described in detail, it is to be understood that various changes, substitutions, and alterations can be made therein without departing from the spirit and scope of the invention as defined by the appended claims.

What is claimed is:

1. In a method for processing data, the steps of organizing a memory unit into a plurality of word positions, each word position having at least a minimum number of corresponding bit positions, each word position including at least one status bit representing the occupancy status of the word, cycling the words to means for writing in the words, and writing new data in each word identified as vacant by the respective status bit.

2. In a method for processing data, the steps of organizing a memory unit into a plurality of word positions, each word position having at least a minimum number of corresponding bit positions, each word position including an occupancy status bit indicating the occupancy status of the word position, scanning the word positions while reading the occupancy status bit and writing new data words in the word positions identified as vacant by the respective occupancy status bits.

3. The method for processing data stored as a plurality of content addressable words each word position having a plurality of bits with at least one bit of each word representing the status of the word which comprises repetitively cycling all of the words to processing logic, processing each word only while at the processing logic, and updating the status bit of each word while the word is still at the processing logic to record the results of said processing.

4. The method of claim 3 including the steps of:

a. designating one of said status bits an occupancy-status bit for representing the occupancy status of its respective word; and b. designating another of said status bits a matched-status bit for representing the respective word satisfying an associative search criteria.

5. The method for processing data comprised of organizing the data into a plurality of words each word having a corresponding number of bit positions and identifiable only by content, continuously and sequentially cycling all of the words past a processing window, processing selected words as the respective words are cycled past the processing window and updating the words in at least one bit position as required to maintain a record of the status of the word in relation to the processing.

6. The method for processing data comprised of organizing the data into a plurality of words each comprised of a corresponding number of bit positions and having at least one status bit, repetitively sequencing the words to a processing window, and updating the respective status bits in accordance with the processing of the respective words before the respective words leave the processing window.

7. The method for processing data comprising organizing the data into a plurality of words each word comprised of a corresponding set of bit positions, one of the bit positions of each word defining the occupancy status of the word and another bit position of each word defining the match status of the word, repetitively sequencing the words to a processing window while processing the respective words only during the period the words are within the processing window, the processing including updating of the status bits to maintain a record of the results of the processing for subsequent processing.

8. The system for associatively processing data which comprises:

logic means for comparing a data word having a plurality of bits to an associative argument and producing a logic signal representative of the comparison, memory means organized to store a plurality of the words and cyclically present the words stored therein to the logic means, and means for updating at least one bit of each word in response to the logic signal from the logic means to store the results of the comparison of the word and the associative argument of said memory means for subsequent processing.

9. The system of claim 8 wherein the memory means is mounted on a rotating member.

10. The system of claim 8 wherein the memory means is a rotating magnetic recording means.

11. The system of claim 8 wherein the memory means comprises a plurality of parallel shift registers having corresponding numbers of bits.

12. The system of claim 8 wherein the logic means includes:

a head buffer for sequentially receiving the words from the memory means, an argument buffer for storing an associative argument, and logic gate means for comparing the word in the head buffer to the word in the argument buffer.

13. The system of claim 12 wherein the logic gate means includes means for producing an "equal to" logic signal when the word in the head buffer is equal to the word in the argument buffer.

14. The system of claim 12 wherein the logic gate means includes means for producing a "greater than" logic signal when the word in the head buffer is greater than the word in the argument buffer.

15. The system of claim 14 further characterized by means of shifting the word in the head buffer to the argument buffer when a "greater than" logic signal is produced by the logic gate means.

16. The system of claim 14 further characterized by means of shifting the word in the head buffer to the argument buffer when a "less than" logic signal is produced by the logic gate means.

17. The system of claim 12 wherein the logic gate means includes means for producing a "less than" logic signal when the word in the head buffer is less than the word in the argument buffer.

18. The system of claim 8 wherein the means for updating said at least one bit of each word comprises means for writing in said at least one bit after the word has passed the logic means.

19. The system of claim 8 further characterized by:

write means for writing in the words of the memory means as the words are cyclically presented to the write means, and means for reading said at least one bit prior to the presentation of the respective word to the write means and enabling the write means as the respective word is presented to the write means when said at least one bit contains a predetermined logic condition.

20. The system defined in claim 8 further characterized by:

read means for reading the words in memory as the words are cyclically presented to the read means, and means for reading said at least one bit prior to the presentation of the data word to the read means and producing a logic signal enabling the read means to read the respective word as it is presented to the read means.

21. In a system for processing data, the combination of:

rotating storage means defining a plurality of data words each having a plurality of bits, each word including at least one corresponding status bit, means for simultaneously reading said plurality of bits of each word in succession and comparing the bits with an associative argument and producing a logic signal representative of the comparison, and means for writing in the corresponding status bit in response to the logic signal to record the results of the comparison.

22. In a system for processing data, the combination of:

rotating storage means defining a plurality of data words each having a plurality of bits, each word including a corresponding occupancy-status bit, write means for writing in the bits of each word as the storage means rotates the respective words past the read means, means for reading the occupancy-status bit of each word prior to the positioning of the word at the write means and producing a logic signal enabling the write means as the corresponding word is positioned at the write means when the occupancy-status bit indicates that the word is vacant, and means for updating the occupancy-status bit for each word when a new word is written therein to indicate that the word is occupied.

23. In a system for processing data the combination of:

rotating storage means defining a plurality of data words each having a plurality of corresponding bits, each word including a corresponding match-status bit, read means for reading the bits of each word as the storage means rotates past the read means, and means for reading the match-status bit of each word prior to the positioning of the corresponding word at the read means and producing a logic signal enabling the read means as the corresponding word is positioned at the read means when the match-status bit indicates that the word is matched.

24. In a system for processing data, the combination of:

rotating storage means having a plurality of data tracks and at least one status track, read means for simultaneously writing bits of data on the respective data tracks and write means for simultaneously reading bits of data from the respective data tracks to define a series of words each having a corresponding number of bits, status track read means for reading bits from the status track, status track write means for writing on the status track after the read means, shift register means having a number of bits equal to the number of bit positions on the status track between the status track read means and the status track write means for transferring data bits from the status track read means to the status track write means, first logic means responsive to the data in a bit of the shift register means for selectively enabling the read means as the corresponding word is positioned at the read means, and second logic means responsive to the performance of a read or write function in a word for updating the corresponding bit in the shift register means for writing back on the status track.

25. In a system for processing data, the combination of: associative processing means, and storage means for cycling a plurality of associatively organized data words to the associative processing means, and for cycling a status bit of information corresponding to each data word with the corresponding data words including means for reading the status bit prior to arrival of the corresponding data word at the associative processing means and means for updating the status bit after the corresponding data word has been situated at the processing means for processing.

26. A method for processing data comprising the steps of:

a. organizing a memory unit into a plurality of word positions, each word position having at least a minimum number of corresponding bit positions including at least one status bit position;
b. repetitively cycling the words stored in said memory unit to data processing logic; and
c. performing data processing operations on the words with said processing logic, the data processing operations including:
d. updating the at least one status bit of the respective words as required to represent the results of the data processing to said words.

27. The method of claim 26 including the steps of:

a. recording words on a rotating storage means of said memory unit; and
b. cycling said rotating storage means past a read-write station of said memory unit.

28. The method of claim 26 including the step of shifting words through a fixed storage means of said memory unit to a read-write station of said memory unit.

29. A method for processing data comprising the steps of:

a. organizing a memory unit into a plurality of word positions, each word position having at least a minimum number of corresponding bit positions including at least two status bits;
b. designating one of said status bits an occupancy status bit for representing the occupancy status of its respective word;
c. designating another of said status bits a match-status bit for representing the respective word satisfying an associative search criteria;
d. repetitively cycling the words stored in said memory unit to data processing logic; and
e. performing data processing operations on the words stored in said memory unit with said data processing logic, said data processing operations including:
f. updating the status bits of respective words as required to represent the results of the data processing to said words.

30. The method of claim 29 including the steps of:

a. comparing the words indicated as occupied by said occupancy bits to an associated argument at preselected bits; and
b. updating said match-status bits of the respective words to reflect the results of the comparison.

31. The method of claim 30 wherein said match-status bits are updated to a matched status for each word that is identical to the argument at selected bits.

32. The method of claim 30 wherein the match-status bit is updated to a matched status for each word that is greater than the argument at selected bits.

33. The method of claim 30 wherein the match-status bit is updated to a matched status for each word that is less than the argument at selected bits.

34. The method of claim 30 wherein the match-status bit is updated to a matched status for each word that is greater than or equal to the argument at selected bits.

35. The method of claim 30 wherein the match-status bit is updated to a matched status for each word that is less than or equal to the argument at selected bits.

36. The method of claim 29 including the step of reading the words in which the matched status bits indicate that a previous associative search criteria was satisfied during subsequent cycles of the word.